United States Patent
Tsai et al.

(10) Patent No.: US 11,422,847 B2
(45) Date of Patent: *Aug. 23, 2022

(54) SYNCHRONOUS BUSINESS PROCESS EXECUTION ENGINE FOR ACTION ORCHESTRATION IN A SINGLE EXECUTION TRANSACTION CONTEXT

(71) Applicant: Open Text Corporation, Waterloo (CA)

(72) Inventors: Kenwood Tsai, Palo Alto, CA (US); Satyapal P. Reddy, Fremont, CA (US); Ravikumar Meenakshisundaram, Pleasanton, CA (US)

(73) Assignee: Open Text Corporation, Waterloo (CA)

( * ) Notice: Subject to any disclaimer, the term of this patent is extended or adjusted under 35 U.S.C. 154(b) by 77 days.

This patent is subject to a terminal disclaimer.

(21) Appl. No.: 14/975,331

(22) Filed: Dec. 18, 2015

(65) Prior Publication Data
US 2016/0162328 A1 Jun. 9, 2016

Related U.S. Application Data

(63) Continuation of application No. 13/435,997, filed on Mar. 30, 2012, now Pat. No. 9,250,869.

(51) Int. Cl.
| | | |
|---|---|---|
| *G06F 9/46* | (2006.01) | |
| *G06F 8/20* | (2018.01) | |
| *G06F 9/50* | (2006.01) | |
| *G06Q 10/06* | (2012.01) | |
| *G06F 8/34* | (2018.01) | |

(52) U.S. Cl.
CPC ............... *G06F 9/467* (2013.01); *G06F 8/22* (2013.01); *G06F 8/34* (2013.01); *G06F 9/5016* (2013.01); *G06Q 10/06* (2013.01); *G06F 9/5038* (2013.01)

(58) Field of Classification Search
CPC . G06F 8/30; G06F 9/5038; G06F 8/20; G06F 9/485; G06Q 10/06
See application file for complete search history.

(56) References Cited

U.S. PATENT DOCUMENTS

| | | | |
|---|---|---|---|
| 7,890,646 B2 | 2/2011 | Khosravy et al. | |
| 8,015,541 B1* | 9/2011 | Srinivasan | G06F 8/20 |
| | | | 717/104 |

(Continued)

OTHER PUBLICATIONS

Shraideh, Ahmad. "Integrating a business process analysis and optimization step using BPMN model in a general process design and development approach : application to a paperless mail flow process". Mar. 24, 2011. HAL Open Science. pp. 43-56. URL: <https://tel.archives-ouvertes.fr/tel-00579520> (Year: 2011).*

(Continued)

*Primary Examiner* — Lewis A Bullock, Jr.
*Assistant Examiner* — Gilles R Kepnang
(74) *Attorney, Agent, or Firm* — Sprinkle IP Law Group

(57) ABSTRACT

An asynchronous business process specification declared in a procedural markup language comprising an activity flow model and a plurality of activities is received. An indication is received that a subset of the plurality of activities is to be synchronously executed without reduced latency. All process execution related objects are fetched once into a memory. The synchronous subset is executed in a single execution transaction context.

20 Claims, 11 Drawing Sheets

(56) References Cited

U.S. PATENT DOCUMENTS

| | | |
|---|---|---|
| 8,543,435 B2 | 9/2013 | Bregant-Belin |
| 9,152,533 B1* | 10/2015 | Fateev .................. G06Q 10/06 |
| 9,250,869 B1 | 2/2016 | Tsai |
| 2002/0032692 A1* | 3/2002 | Suzuki .................. G06Q 10/10 |
| 2003/0018627 A1* | 1/2003 | Turner .................. G06Q 10/10 |
| 2003/0018698 A1* | 1/2003 | Abraham ............... G06Q 10/10 |
| | | 709/201 |
| 2004/0107381 A1* | 6/2004 | Bomfim ............ G06F 17/30312 |
| | | 714/4.12 |
| 2004/0133445 A1* | 7/2004 | Rajan .................. G06Q 10/067 |
| | | 717/108 |
| 2004/0181775 A1* | 9/2004 | Anonsen ............... G06Q 10/06 |
| | | 717/104 |
| 2005/0005259 A1 | 1/2005 | Avery et al. |
| 2007/0234371 A1* | 10/2007 | Upton ..................... G06F 9/541 |
| | | 719/320 |
| 2007/0266377 A1* | 11/2007 | Ivanov ....................... G06F 8/30 |
| | | 717/136 |
| 2008/0300838 A1* | 12/2008 | Drumm .................. G06Q 10/10 |
| | | 703/6 |
| 2009/0049422 A1* | 2/2009 | Hage ......................... G06F 8/34 |
| | | 717/104 |
| 2009/0083632 A1 | 3/2009 | Brosh et al. |
| 2009/0210631 A1 | 8/2009 | Bosworth et al. |
| 2009/0300656 A1 | 12/2009 | Bosworth et al. |
| 2009/0313601 A1 | 12/2009 | Baird et al. |
| 2010/0269113 A1* | 10/2010 | Bregant-Belin ...... G06F 9/5038 |
| | | 718/100 |
| 2011/0238974 A1 | 9/2011 | Wells et al. |
| 2011/0276968 A1* | 11/2011 | Kand .................... G06F 9/5038 |
| | | 718/102 |
| 2012/0198457 A1* | 8/2012 | Leonelli ................. G06Q 10/06 |
| | | 718/102 |
| 2012/0215583 A1* | 8/2012 | Kunti .................. G06Q 10/06 |
| | | 705/7.27 |
| 2013/0073809 A1* | 3/2013 | Antani .................. G06F 12/121 |
| | | 711/136 |
| 2013/0117747 A1* | 5/2013 | Balko ..................... G06F 9/485 |
| | | 718/100 |
| 2013/0139164 A1* | 5/2013 | Balko ....................... G06F 8/41 |
| | | 718/102 |

OTHER PUBLICATIONS

Office Action for U.S. Appl. No. 13/435,997, dated Jul. 9, 2013, 21 pgs.
Office Action for U.S. Appl. No. 13/435,997, dated Dec. 5, 2013, 25 pgs.
Office Action for U.S. Appl. No. 13/435,997, dated Jul. 17, 2014, 19 pgs.
Office Action for U.S. Appl. No. 13/435,997, dated Dec. 23, 2014, 17 pgs.
Appellant's Brief in U.S. Appl. No. 13/435,997, dated Jun. 24, 2015, 31 pgs.

* cited by examiner

SYNCHRONOUS BUSINESS PROCESS EXECUTION ENGINE FOR ACTION ORCHESTRATION IN A SINGLE EXECUTION TRANSACTION CONTEXT

CROSS REFERENCE TO OTHER APPLICATIONS

This application is a continuation of co-pending U.S. patent application Ser. No. 13/435,997, entitled "SYNCHRONOUS BUSINESS PROCESS EXECUTION ENGINE FOR ACTION ORCHESTRATION IN A SINGLE EXECUTION TRANSACTION CONTEXT," filed Mar. 30, 2012, issued as U.S. Pat. No. 9,250,869, which is incorporated herein by reference for all purposes.

BACKGROUND OF THE INVENTION

A business process execution engine ("process engine") provides orchestration for sequences of business activities (called a "business process" or simply "process") in an asynchronous, reliable, and stateful manner.

The business process is defined as an activity flow model, typically declared using a procedural markup language, for example in eXtensible Markup Language ("XML"). An "activity" represents either human performed tasks or automated software services accessed, for example, through an application programming interface ("API").

Typical process engines, while being reliable and stateful, may execute a process with an indeterminate and/or an unpredictable execution time. This is a disadvantage for certain business processes.

BRIEF DESCRIPTION OF THE DRAWINGS

Various embodiments of the invention are disclosed in the following detailed description and the accompanying drawings.

DETAILED DESCRIPTION

Figure 1:
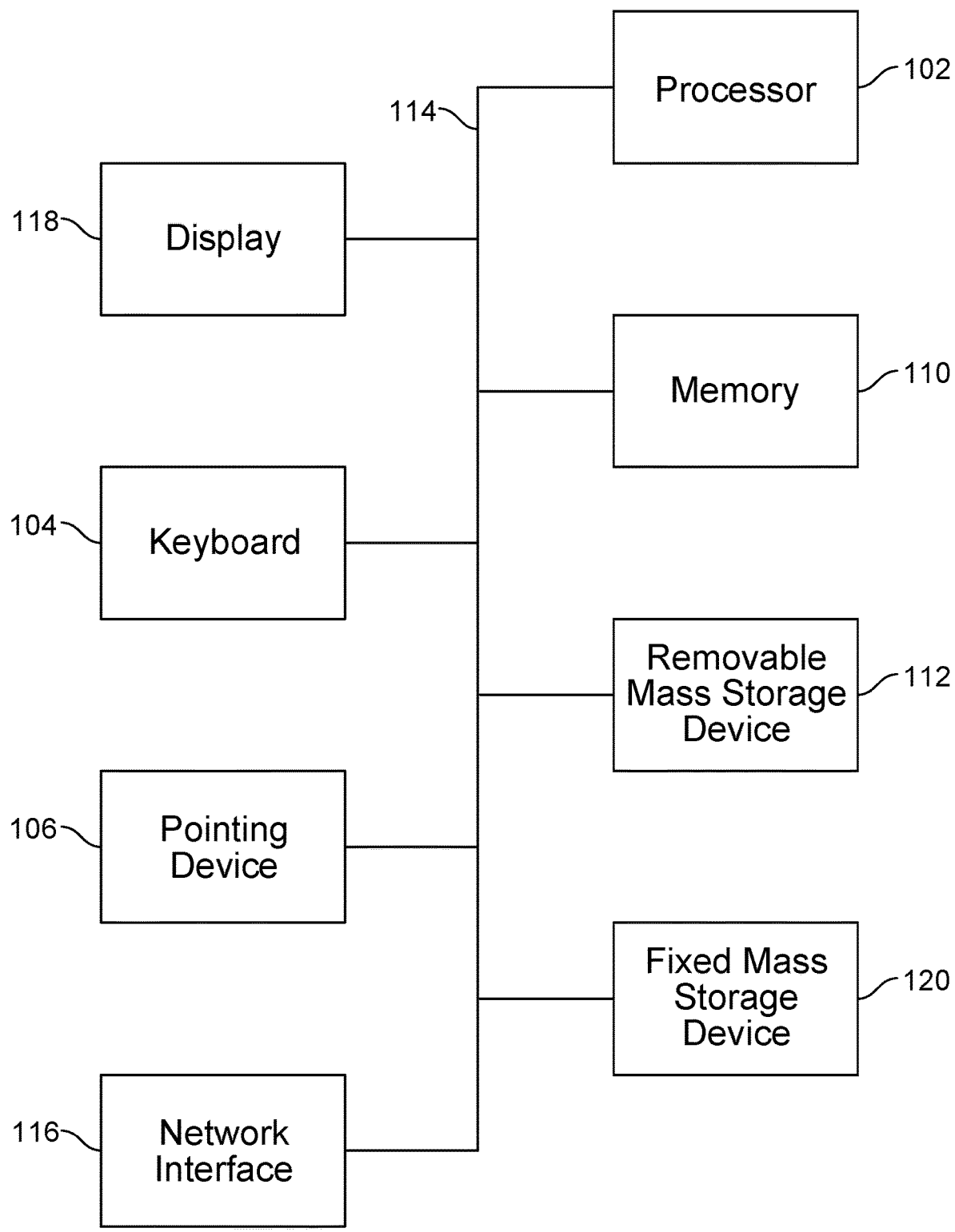
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A synchronous business process execution engine for action orchestration is disclosed.

By design, a typical process engine executes the process in an "asynchronous" manner with respect to the process invocation mechanism. For example, the actual execution of the process by the process engine is not coordinated in time with its invocation. The engine may pause execution and resume it at a later time when resources are available while the invoker has terminated or has moved on to another responsibility.

A business process execution engine that executes business processes synchronously while still supporting all the primary capabilities of a standard asynchronous process engine is disclosed.

In some embodiments, the synchronous process engine executes the exact same business process models that the asynchronous one executes by using the same procedural markup definition; a user defining a process need not learn anything new nor do they need to revise existing models.

In some embodiments, the synchronous process engine operates on an entire business process, or in hybrid fashion as a specified "portion of a process" with the remainder of the business process operated on by an asynchronous process engine.

In some embodiments, differentiating characteristics of the synchronous process engine include:
 All portions of process execution related objects are fetched once and cached for the duration of execution;
 No execution state is persisted during execution;
 The entire portion of a process is executed in a single execution transaction context;
 A "turbo-mode" level of high performance results (for example, because it performs in-memory execution of the portion of a process);
 There is little, controlled, or no persistence-based latency or context switching between activities;
 There are predictable execution times;
 The activities and/or portion of a process executed are easily ordered;
 It supports direct invocation via API; and It is an embeddable engine and/or service.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
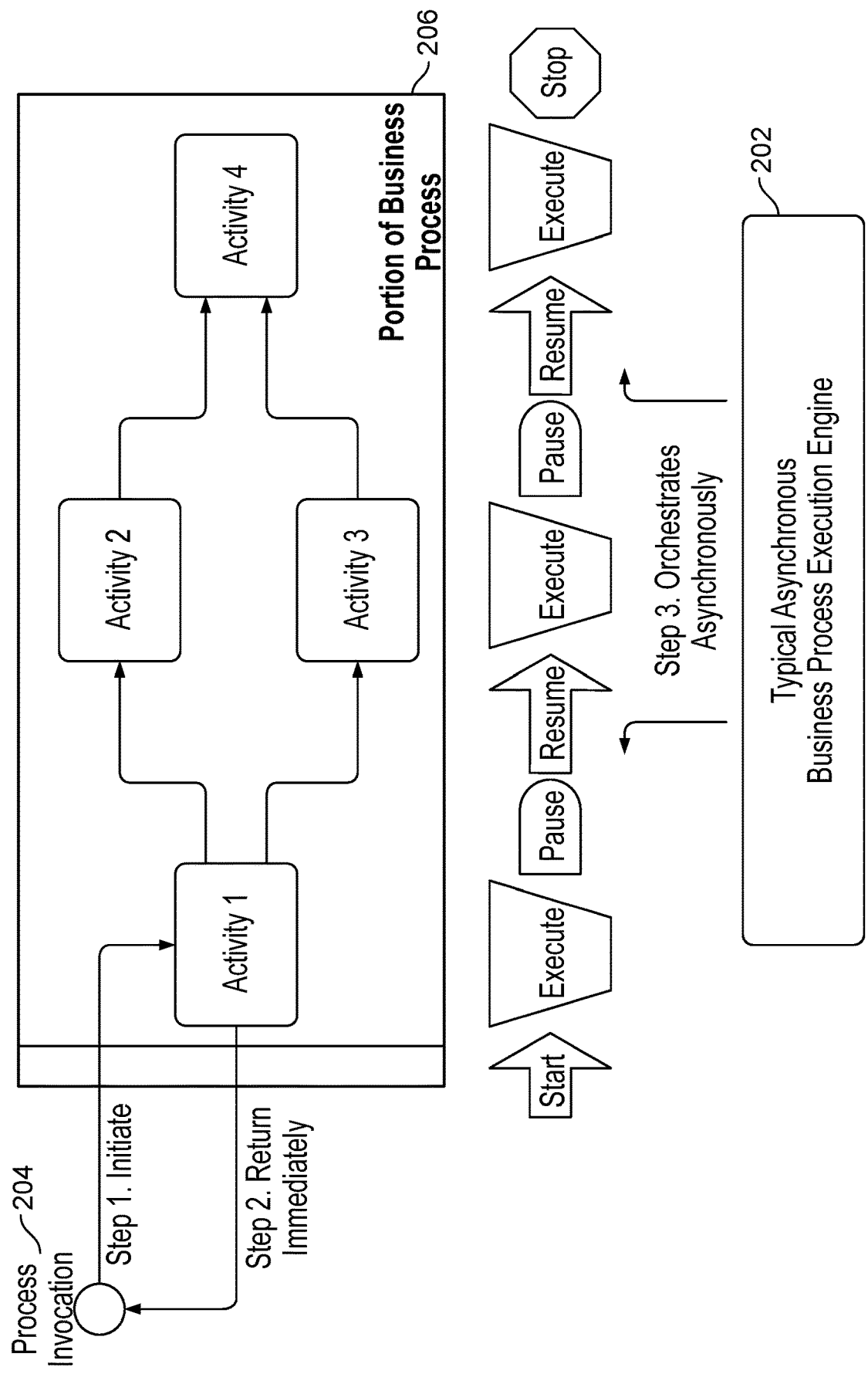
FIG. 2 is a diagram illustrating an embodiment of a typical asynchronous process engine execution of a portion of a process.

FIG. 2 is a diagram illustrating an embodiment of a typical asynchronous process engine execution of a portion of a process. The diagram illustrates a business process and the asynchronous nature of its execution by this typical asynchronous business process execution engine 202.

The overall executing sequence may follow this order:
a. In Step 1, a triggering condition 204 initiates the execution of a portion of a process 206 by the process engine;
b. In Step 2, the initiation request returns immediately to the party requesting the execution and/or invoker; and
c. In Step 3, the asynchronous process engine 202 executes the portion of process 206 over an indeterminate amount of time.

By design, the asynchronous process engine 202 executes over an indeterminate amount of time because it allocates each activity independently to computing resources, for example using a queue. For example, in the example shown in FIG. 2, the engine 202 may allocate Activity 1, 2 and 4 to resources with short queues, but may allocate Activity 3 to a resource with a long queue, suspending the completion of the portion of a process until the resource associated with Activity 3 is freed.

When designing action orchestrated business processes, this indeterminate execution time is a disadvantage. Disadvantages of only using an asynchronous process engine 202 include that:
a. As described above, execution has an indeterminate and unpredictable execution time;
b. It is not suitable for returning data or process-driven change status to the invoker, especially for interactive user interfaces;
c. It requires logical transactional control to logically undo changes affected by process (for example, to compensate);
d. There is a high latency for orchestrating actions, for example within an interactive user interface; and
e. Ordering or prioritization is inconsistent for an asynchronous-only flow because, for example, engine 202 allocates activities to resources dynamically.

Figure 3A:
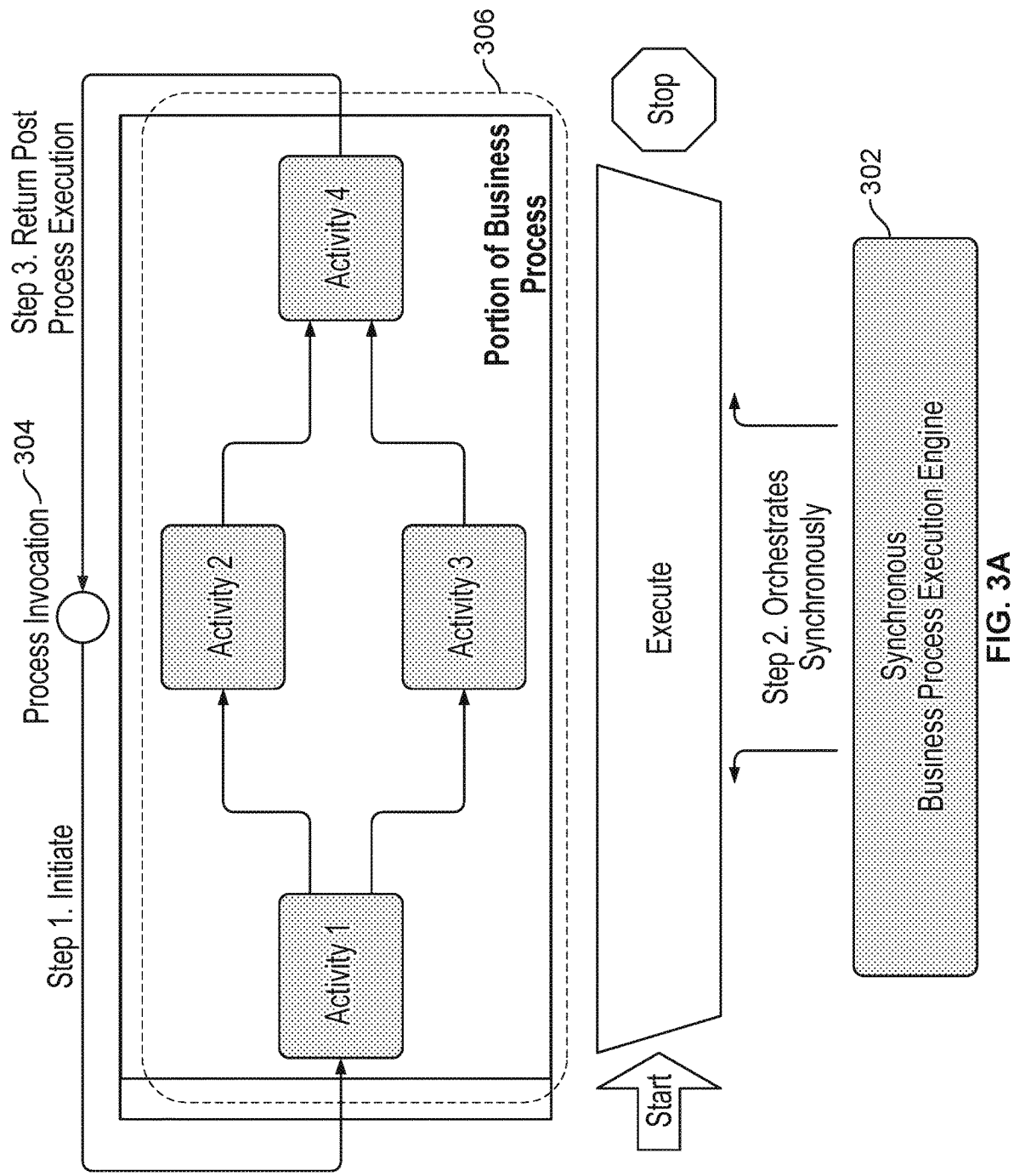
FIG. 3A is a diagram illustrating an embodiment of a synchronous process engine execution of a portion of a process.

FIG. 3A is a diagram illustrating an embodiment of a synchronous process engine execution of a portion of a process. The "synchronous" nature of the execution supports business processes that carry out actions that are synchronous in time relative to their invoker. The diagram in FIG. 3A describes the execution pattern of the synchronous business process execution engine 302.

The executing sequence pattern may follow this order:
a. A triggering condition 304 initiates the execution of a portion of a process 306 by the synchronous process engine and waits in a blocked state for the entire execution duration;
b. The synchronous process engine 302 executes the entire portion of process 306 in a single execution context with a predictable and/or determinate time before returning the results to the initiator 304, releasing it from its blocked state; and
c. The initiating party 304 receives the results of the completed execution and is released to perform other responsibilities.

In one sense, synchronous process engine 302 provides a "static" resource allocation wherein a computing resource is tied up statically for a single execution context, permitting a predictable and/or determinate time for execution.

In some embodiments, the synchronous process engine 302 orchestrates the activities through a variety of flow patterns like splits, parallel joins, "n out of m" joins, error forks, and others. Each orchestration managed by the process engine 302 may be initiated through a variety of different mechanisms, for example by an externally occurring event, through direct invocation via a software API, and/or from a computer software program's graphical user interface.

In some embodiments, the synchronous process engine 302 carries out the same set of activities, provides (e.g., a more limited) set of initiation mechanisms, and is capable of orchestrating the same flow patterns as the asynchronous engine 202. Since manual activities are asynchronous by nature, the synchronous engine executes the manual activities as "null operations," causing neither changes nor side-effects to any aspect of the execution or process relevant data. If no non-manual activities are detected by the engine for forward-progress execution, the engine ends the execution and returns to the invoker immediately. Manual activities and/or "null operations" may be flagged for post-process execution. In some embodiments, if no non-manual activities are detected for forward-progress execution, the engine terminates the process execution and returns immediately, no post-process execution of the remaining manual activities occurs because the process has ended, the engine will not even do the null operation as it is unnecessary (for example, there are no remaining "automated" activities to carry out).

Similarly, rendezvous also known as "wait-for" activities that require waiting for external events to occur, are not allowed for a synchronous process engine as waiting may lock the associated resources.

In some embodiments, with a dedicated associated resource for the synchronous process engine, a simplification is to serialize the parallelized activities synchronous execution. Because the resource is dedicated, the synchronous serialized activities are many times faster than the asynchronous parallelized activities.

Suitability for Action Orchestration

Due to the manner in which it executes business processes, the synchronous process engine 302 may provide orchestration for actions within software applications. "Actions" are defined as changes to or retrieval of data needed by the application that typically require multiple steps and some specific sequencing to accomplish.

Examples of application actions carried out by the engine 302 include querying data from a relational database, calling a remote Web service, uploading content to a repository, sending electronic mail, and sending electronic files to an FTP site. These individual actions are orchestrated to form composite actions by the synchronous process engine 302. The engine 302 allows these actions to be carried out with very low latency with respect to their invocation, and for the information accessed by the actions to be modified without the need to coordinate complex distributed transaction semantics with the synchronous process engine. In some embodiments, the engine has no persistency requirements, thus there is no need for distributed transaction coordination with the data accessed by the engine's activities during execution. This is in contrast to where the distributed transaction coordination comes into play if the engine needs to persist state data, which is unnecessary for a synchronous process engine.

EXAMPLE

Figure 3B:
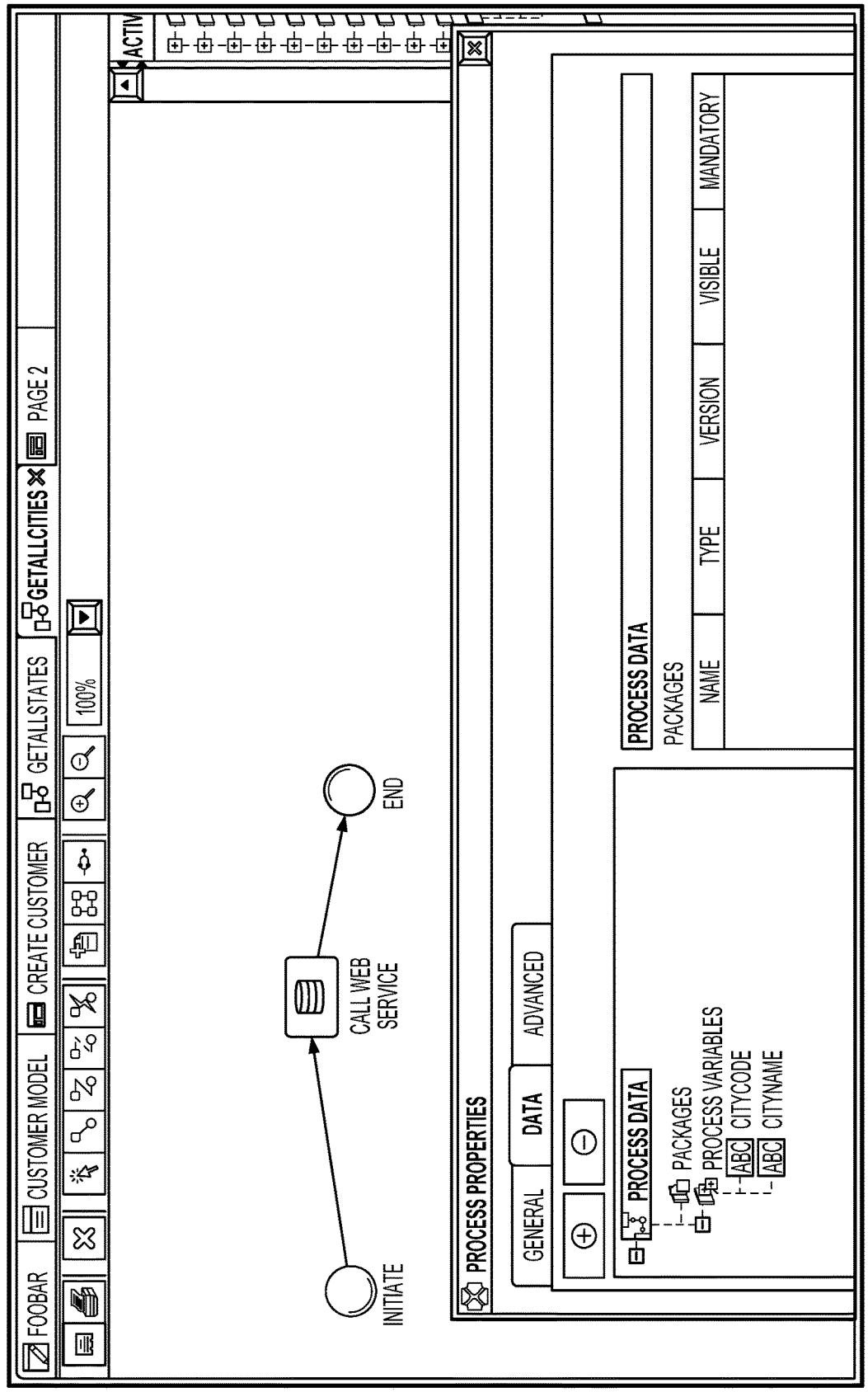
FIGS. 3B and 3C are screenshots illustrating an web service example of a synchronous process engine execution of a portion of a process.
Figure 3C:
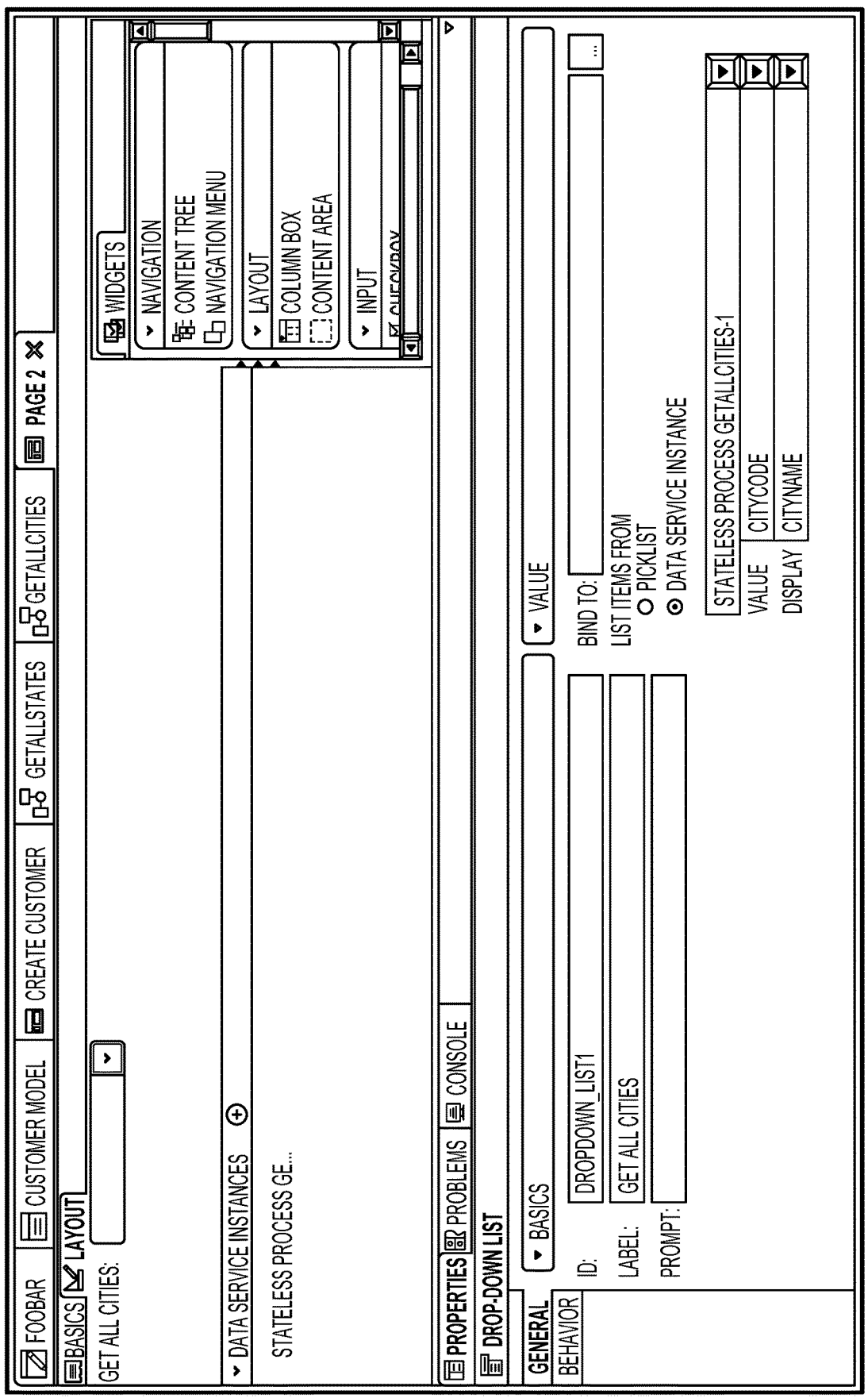

FIGS. 3B and 3C are screenshots illustrating an web service example of a synchronous process engine execution of a portion of a process.

One example is looking up city data to use in filling out user interface web forms, for example verifying zip codes and/or area codes, etc. The business portion of a process would be a single activity as shown in FIG. 3B. The activity is executed synchronously to fill out the drop-down GUI control on the Web Form to list all cities for a particular US State as shown in FIG. 3C.

Figure 4A:
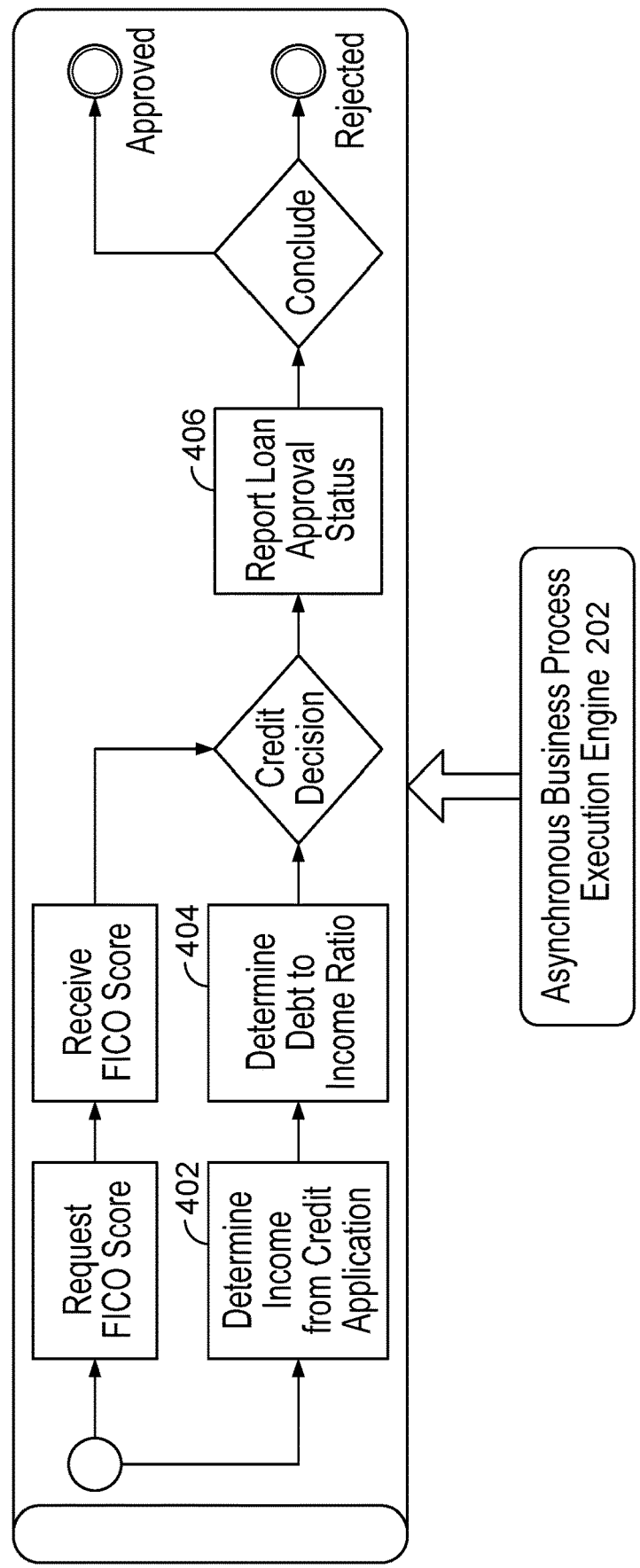
FIGS. 4A and 4B are diagrams illustrating an embodiment of a hybrid asynchronous and synchronous process engine specification and/or user interface.
Figure 4B:
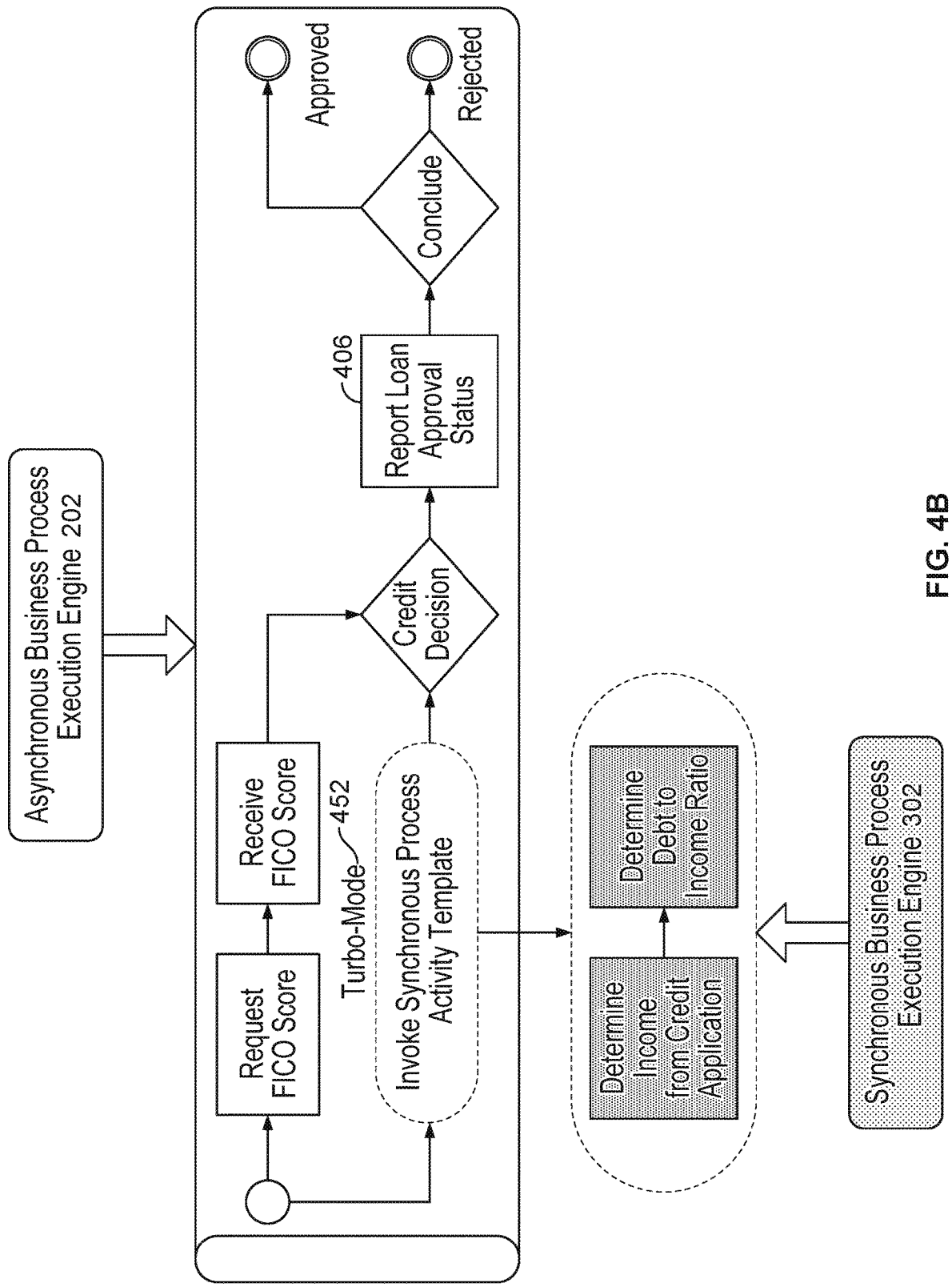

FIGS. 4A and 4B are diagrams illustrating an embodiment of a hybrid asynchronous and synchronous process engine specification and/or user interface. In FIG. 4A, a process is defined in, for example a flow model. Proprietary, de facto or industry standards may be used, for example the Business Process Model and Notation ("BPMN") standard, and expressed in a markup language, for example XML, the XML Process Definition Language ("XPDL") and/or the Business Process Execution Language ("BPEL").

In some embodiments upon model definition and/or creation, by default the system assumes an asynchronous process engine will execute all activities. The example given in FIG. 4A is a loan approval process which includes two sequential activities, a determination of income from a credit application 402 and a determination of a debt to income ratio 404, and another activity reporting the loan approval status 406. Using only an asynchronous engine 202, there may be no way to predict execution time for activities 402 and 404 together.

In FIG. 4B, the user or system specifies that activities 402 and 404 are to be executed synchronously 452 in a "Turbo Mode" by synchronous engine 302, and thus are shown in a different grey color. The remaining activities, for example 406, are still executed by the asynchronous engine 202. In this way the system designer can assign a predictable execution time for activities 402 and 404 together.

In one embodiment, an activity type called an "activity template" is used to represent the invocation of synchronous process/states within the larger business process. In FIG. 4B, a single activity 452 would represent a different process that would be executed synchronously (i.e. in "Turbo-mode"). That process would contain the two activities Determine Income from Credit Application and Determine Debt to Income Ratio.

Figure 5:
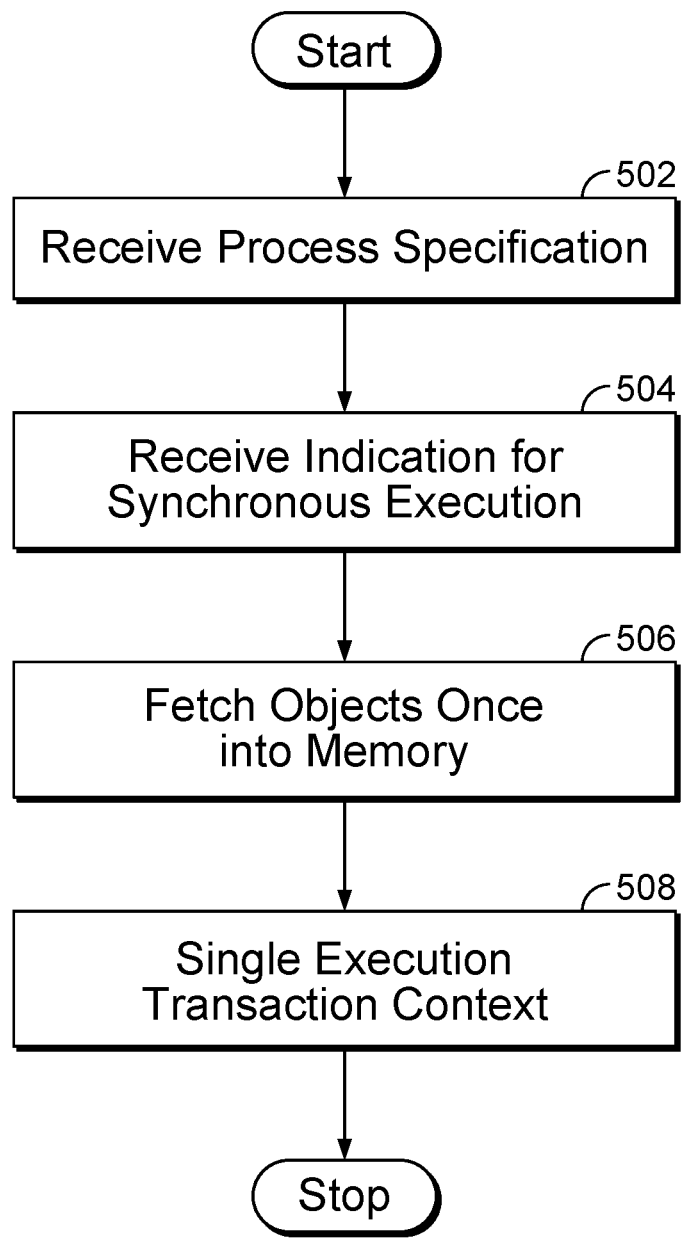
FIG. 5 is a flowchart illustrating synchronous process engine execution.

FIG. 5 is a flowchart illustrating synchronous process engine execution. In some embodiments the process of FIG. 5 is executed in synchronous process engine 302 of FIG. 3.

In step 502, an asynchronous business process specification declared in a procedural markup language comprising an activity flow model and more than one activity is received. For example, the procedural markup language may be expressed in XML, XPDL, BPEL and/or BPMN.

In step 504, an indication that a subset of the activities is to be synchronously executed without reduced latency is received. In some embodiments, the synchronous subset that is manual activities is identified as null operations. The indication may be received via an API or via a user interface. In some embodiments, the engine 302 identifies any activities in the synchronous subset that are rendezvous activities and flags them as not synchronously executable. In some embodiments, the engine 302 identifies parallelized activities within the synchronous subset and serializes the parallelized activities for synchronous execution.

In step 506, all process execution related objects are fetched once into cache and/or memory. In step 508, the synchronous subset is executed in a single execution transaction context. For example, the synchronous subset may be executed without clearing the process execution related objects from the memory and/or without recording an execution state during the execution. Executing in a single execution transaction context includes executing with a predictable execution time. In some embodiments, the null operations are flagged for future manual execution.

Figure 6A:
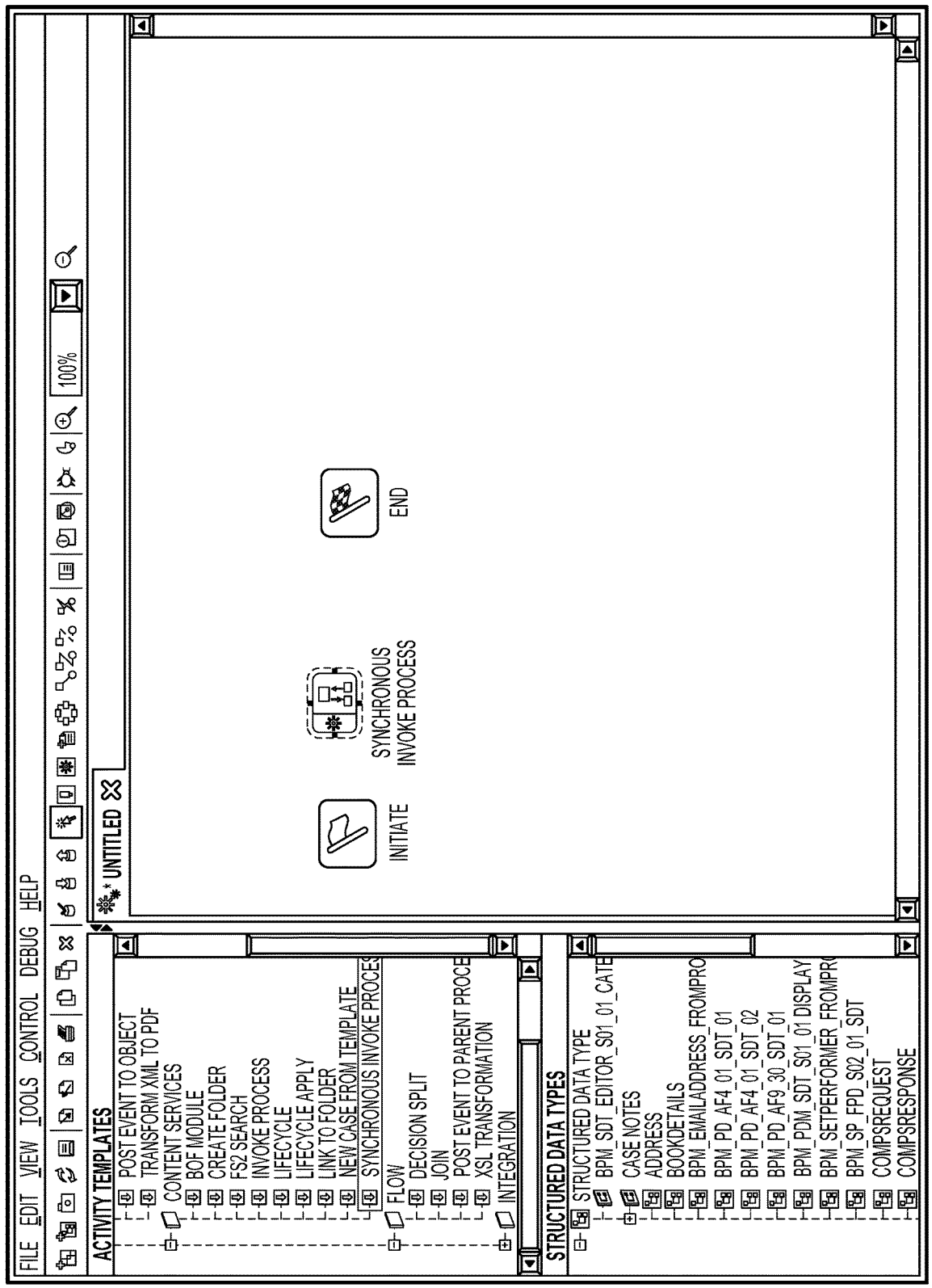
FIGS. 6A, 6B and 6C are screenshots used to describe to users on how to use the synchronous engine.
Figure 6B:
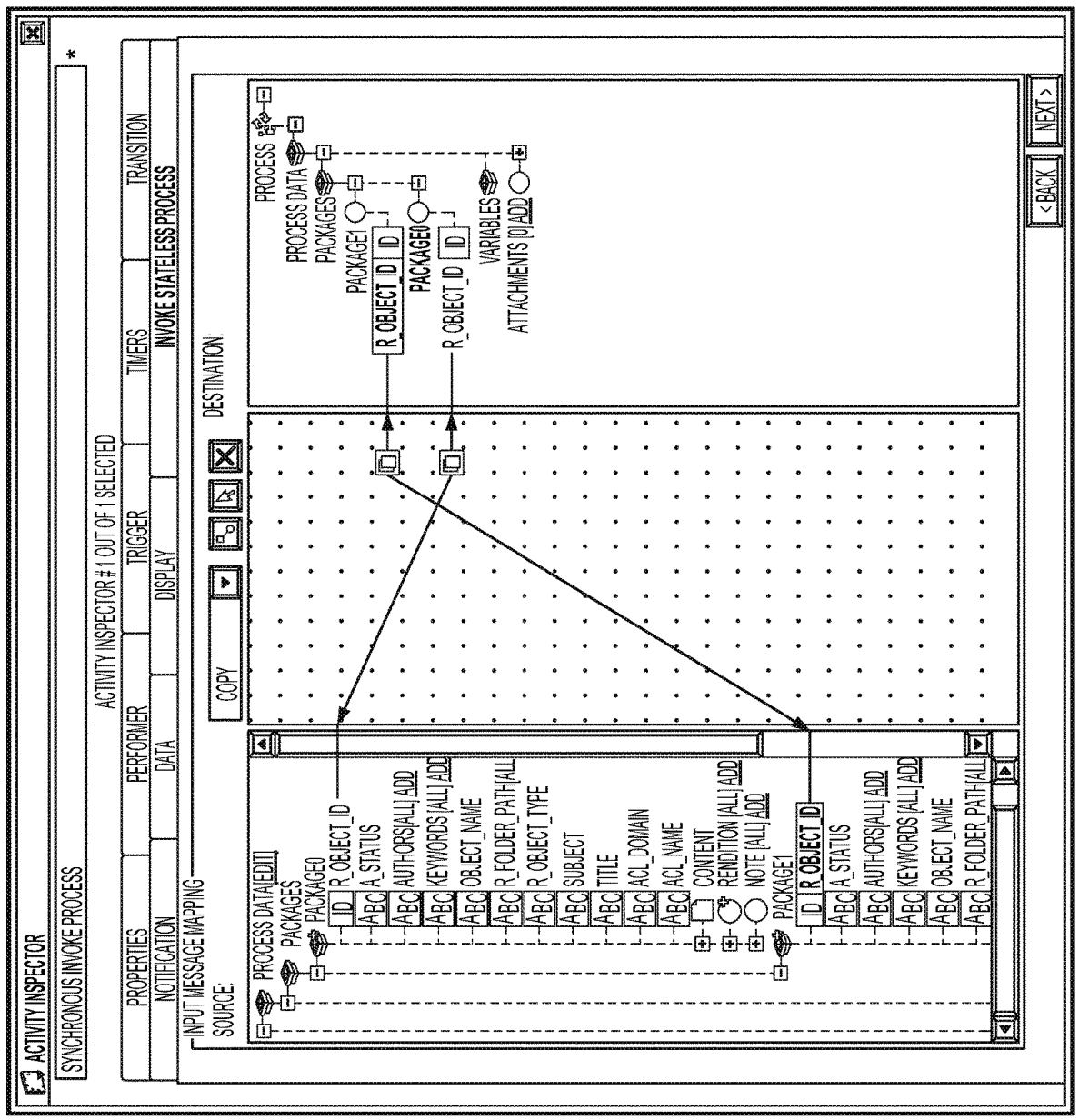
Figure 6C:
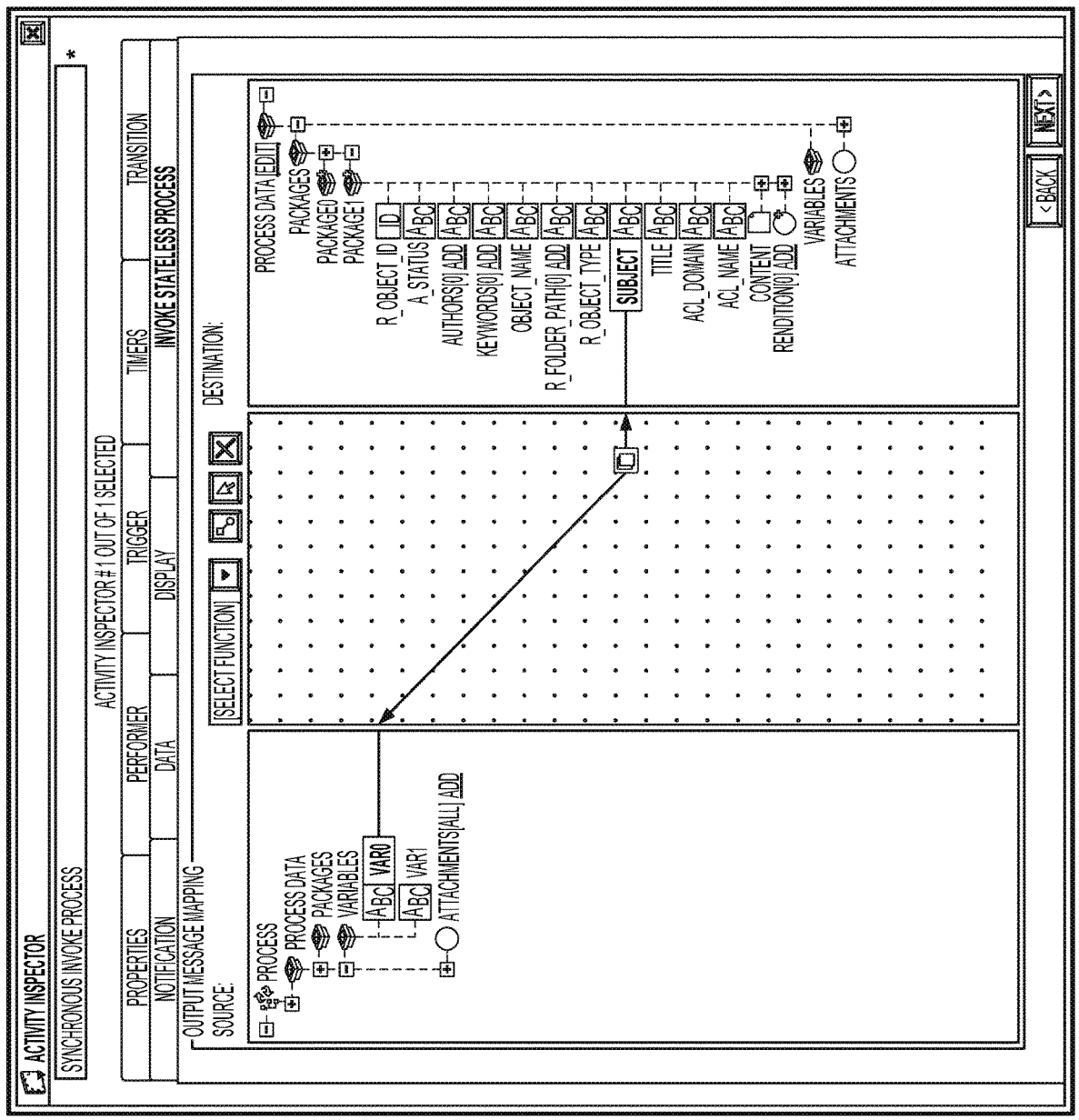

FIGS. 6A, 6B and 6C are screenshots used to describe to users on how to use the synchronous engine.

Without limitation, the following are example release notes that can be used to describe use of the synchronous engine:

Stateless Process Engine Release Notes

Use the stateless process engine to execute process instances in memory. The stateless process engine relies on a Synchronous Invoke Process activity that invokes a workflow synchronously. The synchronous transaction commits only at the end of the workflow, so that if an error occurs during the subprocess, the entire workflow fails.

The stateless process engine offers the following benefits:
  Improved performance since the stateless process executes completely in the method server in one thread and in one session.
  The Synchronous Invoke Process activity template supports input and output mapping. The standard Invoke Process template has input mapping only.
  If better performance is desired and the invoked subprocess contains only automatic activities, the stateless process engine is easily applied to an existing accelerated composition platform solution. Applying the stateless process engine involves replacing the Invoke Process activity with the Synchronous Invoke Process activity.

Invoking process instances using the Synchronous Invoke Process activity provides significant performance improvement. For example, during in-house testing the execution time of one workflow instance containing 20 activities was reduced from three seconds to 160 milliseconds. Actual performance benefits depends on multiple factors including load, the number of processors, processor speed, and the nature of the activities in the process.

The following limitations may apply to stateless workflows:
  Stateless processes execute in one transaction and in one thread. While executing a process in one transaction leads to improved performance, it also may increase the scope of the transaction when compared to a regular process. The increase in scope of transaction duration means there may be more version mismatch errors if another stateless or regular process modifies the same set of objects.
  Stateless process instances may not populate the database used for reporting. Reporting may be disabled for stateless process instances.
  Lifecycle activities may not be supported as they rely on opening another transaction, and stateless process instances typically run in a single transaction.
  All activities in the stateless process may be run by the performer of the synchronous invoke activity, regardless of the setting in the automatic activity.
  A stateless process may not have manual activities, timer settings in activities, inbound initiate or step activities, or trigger conditions (or events) in activities.

Configuring a Stateless Workflow
  1. Within a process builder, open a process.
  2. Drag and drop the Synchronous Invoke Process activity template from the activity templates window on to the process template editor pane as shown in FIG. 6A.
  3. Open an activity inspector and select Invoke Stateless Process.
  4. In the Process Name list box select a process.

5. Complete the input message mapping to map the process data of the selected stateless process and click Next.
6. Complete the Output Message Mapping to map the completed process data to the parent process and click Ok as shown in FIG. 6B and FIG. 6C.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of hybrid asynchronous and synchronous execution, comprising:
   receiving an asynchronous process specification comprising an activity flow model and a plurality of activities, the plurality of activities including at least one asynchronous activity, the activity flow model defining an asynchronous process comprising the plurality of activities, wherein the received asynchronous process specification is declared in an executable procedural markup language;
   specifying that a selected portion of the asynchronous process defined by the activity flow model of the asynchronous process specification is to be synchronously executed, the selected portion including two or more sequential activities in the activity flow model;
   receiving an indication that the selected portion of the asynchronous process defined by the activity flow model of the asynchronous process specification is to be synchronously executed, wherein the selected portion of the asynchronous process includes the at least one asynchronous activity;
   in response to the received indication, orchestrating, by a synchronous business process execution engine, a subset of the plurality of activities in the selected portion of the asynchronous process to form a composite action that includes the at least one asynchronous activity and at least an additional one of the plurality of activities in the selected portion of the asynchronous process, wherein the synchronous business process execution engine statelessly executes the composite action as a single transaction in a single thread by:
      fetching all process execution related objects associated with the two or more sequential activities of the asynchronous process once, and caching the fetched objects in memory;
      forming the composite action from the two or more sequential activities;
      allocating a static computing resource for the thread to execute the composite action; and
      based on the thread and the allocated static computing resource, synchronously executing, in-memory and without recording an execution state, the composite action in a single execution transaction context with a predictable execution time; and
   asynchronously executing, by an asynchronous business process execution engine, a remaining portion of the asynchronous process.

2. A method as recited in claim 1, further comprising:
   identifying any activities of the selected portion that are manual activities as null operations; and
   flagging null operations for future manual execution.

3. A method as recited in claim 1, wherein executing the composite action synchronously in a single execution transaction context comprises executing without clearing the fetched process execution related objects from the memory.

4. A method as recited in claim 1, wherein the indication is received via an application programming interface ("API").

5. A method as recited in claim 1, wherein a specific activity within the plurality of activities is executed using an API.

6. A method as recited in claim 1, wherein the procedural markup language is expressed in eXtensible Markup Language ("XML").

7. A method as recited in claim 1, wherein the procedural markup language is expressed in one or more of the following:
   XML Process Definition Language ("XPDL"), Business Process Execution Language ("BPEL"), or the Business Process Model and Notation ("BPMN").

8. A method as recited in claim 1, further comprising:
   identifying any activities of the selected portion that are rendezvous activities; and
   flagging the rendezvous activities as not executable.

9. The method of claim 1, further comprising:
   identifying parallelized activities within the selected portion of the asynchronous process; and
   serializing the parallelized activities for synchronous execution.

10. The method of claim 1, wherein the selected portion of the plurality of activities is the plurality of activities.

11. A method as recited in claim 1, further comprising:
    initiating asynchronous execution of a second portion of the process defined by the activity flow model, the second portion being different from the selected portion, the selected portion of the process defined by the activity flow model comprises a first subset of the plurality of activities, the second portion of the process defined by the activity flow model comprising a second subset of the plurality of activities, and the fetched objects remaining cached for a duration of the execution of the first subset.

12. A system, comprising:
    a processor configured to:
       receive an asynchronous process specification declared in a procedural markup language comprising an activity flow model and a plurality of activities, the plurality of activities including at least one asynchronous activity, and the activity flow model defining an asynchronous process comprising the plurality of activities;
       specify that a selected portion of the asynchronous process defined by the activity flow model of the asynchronous process specification is to be synchronously executed, the selected portion including two or more sequential activities in the activity flow model;
       receive an indication that the selected portion of the asynchronous process defined by the activity flow model of the asynchronous process specification is to be synchronously executed, wherein the selected portion of the asynchronous process includes the at least one asynchronous activity; and
       in response to the received indication, orchestrating, by a synchronous business process execution engine, a subset of the plurality of activities in the selected portion of the asynchronous process to form a composite action that includes the at least one asynchronous activity and at least an additional one of the plurality of activities in the selected portion of the asynchronous process, and statelessly executing the composite action as a single transaction in a single thread by:

fetching all process execution related objects associated with two or more sequential activities of the asynchronous process once, and caching the fetched objects in memory; and forming the composite action from the two or more sequential activities;

allocating a static computing resource for the thread to execute the composite action; and based on the thread and the allocated static computing resource, synchronously executing, in memory and without recording an execution state, the composite action in a single execution transaction context with a predictable execution time; and asynchronously executing, by an asynchronous business process execution engine a remaining portion of the asynchronous process; and a memory coupled to the processor and configured to provide the processor with instructions.

13. The system recited in claim 12, wherein the memory is further configured to provide the processor with instructions which when executed cause the processor to:

identify any activities of the selected portion that are manual activities as null operations; and flag null operations for future manual execution.

14. The system recited in claim 12, wherein executing the composite action in a single execution transaction context includes executing without clearing the process execution related objects from the memory.

15. The system recited in claim 12, wherein the procedural markup language is expressed in one or more of the following:

XML Process Definition Language ("XPDL"), Business Process Execution Language ("BPEL"), or the Business Process Model and Notation ("BPMN").

16. The system recited in claim 12, wherein the memory is further configured to provide the processor with instructions which when executed cause the processor to:

initiate asynchronous execution of a second portion of the process defined by the activity flow model, the second portion being different from the selected portion, the selected portion of the process defined by the activity flow model comprises a first subset of the plurality of activities, the second portion of the process defined by the activity flow model comprising a second subset of the plurality of activities, and the fetched objects remaining cached for a duration of the execution of the first subset.

17. A computer program product, the computer program product being embodied in a non-transitory computer readable storage medium and comprising computer instructions for:

receiving an asynchronous process specification declared in a procedural markup language comprising an activity flow model and a plurality of activities, the plurality of activities including at least one asynchronous activity, and the activity flow model defining an asynchronous process comprising the plurality of activities;

specifying that a selected portion of the asynchronous process defined by the activity flow model of the asynchronous process specification is to be synchronously executed, the selected portion including two or more sequential activities in the activity flow model;

receiving an indication that the selected portion of the asynchronous process defined by the activity flow model of the asynchronous process specification is to be synchronously executed, wherein the selected portion of the asynchronous process includes the at least one asynchronous activity;

based on the received indication, orchestrating, by a synchronous business process execution engine, a subset of the plurality of activities in the selected portion of the asynchronous process to form a composite action that includes the at least one asynchronous activity and at least an additional one of the plurality of activities in the selected portion of the asynchronous process, and statelessly executing the composite action as a single transaction in a single thread by:

fetching all process execution related objects associated with the two or more sequential activities of the asynchronous process once, and caching the fetched objects in memory; and forming the composite action from the two or more sequential activities;

allocating a static computing resource for the thread to execute the composite action; and based on the thread and the allocated static computing resource, synchronously executing, in memory and without recording an execution state, the composite action in a single execution transaction context with a predictable execution time; and asynchronously executing, by an asynchronous business process execution engine, a remaining portion of the asynchronous process.

18. The computer program product recited in claim 17, further comprising computer instructions for:

identifying any activities of the selected portion that are manual activities as null operations; and flagging null operations for future manual execution.

19. The computer program product recited in claim 17, wherein executing the composite action in a single execution transaction context includes executing without clearing the fetched process execution related objects from the memory.

20. The computer program product recited in claim 17, wherein the procedural markup language is expressed in one or more of the following:

XML Process Definition Language ("XPDL"), Business Process Execution Language ("BPEL"), or the Business Process Model and Notation ("BPMN").

* * * * *